(12) United States Patent
Schmidt et al.

(10) Patent No.: US 11,584,204 B2
(45) Date of Patent: Feb. 21, 2023

(54) MULTI-PART FRAME FOR A VEHICLE SLIDING SUNROOF OR VEHICLE SLIDING AND TILTING ROOF AND METHOD FOR ASSEMBLING A MULTI-PART FRAME

(71) Applicant: Roof Systems Germany GmbH, Dietzenbach (DE)

(72) Inventors: Juergen Schmidt, Dietzenbach (DE); Stefan Vogel, Dietzenbach (DE); Joachim Roeder, Dietzenbach (DE)

(73) Assignee: Roof Systems Germany GmbH, Dietzenbach (DE)

( * ) Notice: Subject to any disclaimer, the term of this patent is extended or adjusted under 35 U.S.C. 154(b) by 902 days.

(21) Appl. No.: 16/502,132

(22) Filed: Jul. 3, 2019

(65) Prior Publication Data
US 2020/0011106 A1 Jan. 9, 2020

(30) Foreign Application Priority Data

Jul. 4, 2018 (DE) ...................... 10 2018 116 227.8
Jul. 31, 2018 (DE) ...................... 20 2018 104 398.6

(51) Int. Cl.
*B60J 7/02* (2006.01)
*B62D 65/06* (2006.01)

(52) U.S. Cl.
CPC ............... *B60J 7/022* (2013.01); *B60J 7/02* (2013.01); *B62D 65/06* (2013.01); *E05Y 2900/542* (2013.01)

(58) Field of Classification Search
CPC ..... B60J 7/02; B60J 7/022; B60J 7/057; B60J 7/0573; B60J 7/043; B60J 7/0435; B60J 7/047; B60J 7/05; B60J 7/053
(Continued)

(56) References Cited

U.S. PATENT DOCUMENTS

| 4,272,123 A | 6/1981 | Mori |
| 4,968,090 A | 11/1990 | Schleicher et al. |

(Continued)

FOREIGN PATENT DOCUMENTS

| CN | 205615323 U | 10/2016 |
| DE | 2912665 A1 | 10/1979 |

(Continued)

*Primary Examiner* — Dennis H Pedder
(74) *Attorney, Agent, or Firm* — Dilworth IP, LLC

(57) ABSTRACT

A multi-part frame (10) for a sliding roof of a vehicle or a tilt-and-slide roof of a vehicle for guiding and holding a movable cover element allocated to a corresponding roof opening is specified, with a support component (12) formed as a plastic injection-moulded part, in which open cable channels (24) are moulded, in order to guide drive cables for moving the cover element, which are in drive engagement with a drive device, displaceably in a compression-resistant manner, wherein the cable channels (24) are configured such that they can be closed by at least one cover (14) likewise formed as a plastic injection-moulded part and fastenable to the support component (12), and wherein the fastening of the cover (14) to the support component (12) is configured such that an installation direction during fastening of the cover (14) to the support component (12) runs in the horizontal direction. Furthermore, a method for installing a multi-part frame (10) is specified.

14 Claims, 3 Drawing Sheets

Figure 1:
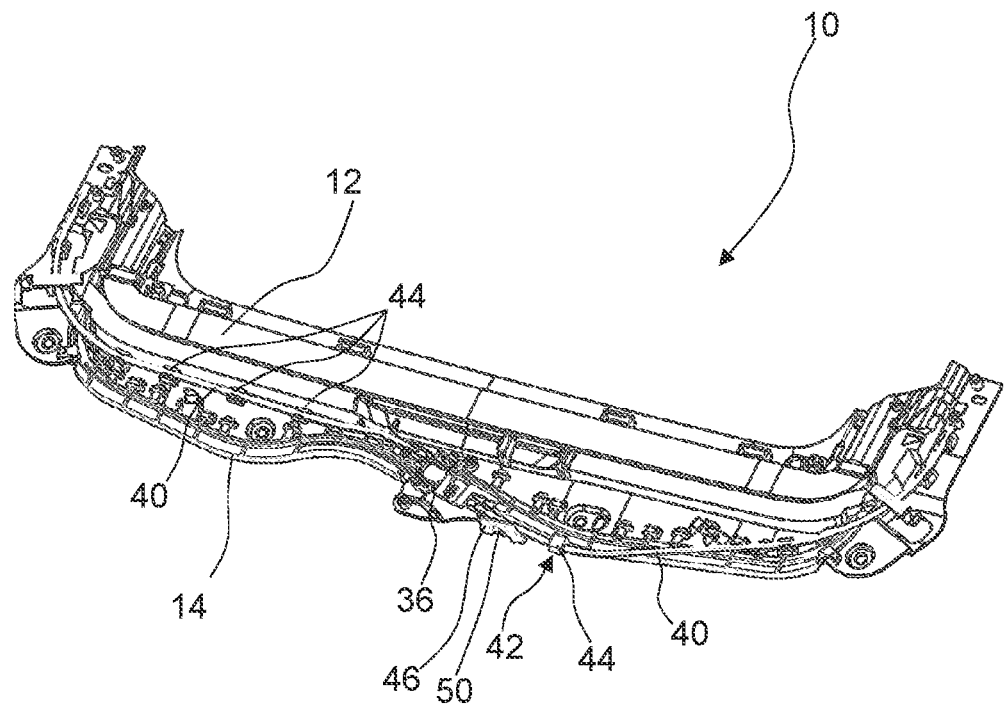

(58) Field of Classification Search
USPC .......................................... 296/216.01–216.8
See application file for complete search history.

(56) References Cited

U.S. PATENT DOCUMENTS

| | | | |
|---|---|---|---|
| 4,969,681 A | | 11/1990 | Schleicher et al. |
| 6,431,644 B1* | | 8/2002 | Nagashima .............. B60J 7/022 |
| | | | 296/223 |
| 6,663,172 B2 | | 12/2003 | Weiss et al. |
| 6,832,811 B2 | | 12/2004 | Nabuurs |
| 2003/0047969 A1 | | 3/2003 | Weiss et al. |
| 2004/0041443 A1 | | 3/2004 | Nabuurs |

FOREIGN PATENT DOCUMENTS

| | | |
|---|---|---|
| DE | 3727719 A1 | 3/1989 |
| DE | 3727720 A1 | 3/1989 |
| DE | 10219395 A1 | 11/2003 |
| DE | 60213208 T2 | 7/2007 |
| DE | 102006002004 A1 | 9/2007 |
| DE | 102016221942 B3 | 3/2018 |
| EP | 1291214 A2 | 3/2003 |
| GB | 685964 A | 1/1953 |

* cited by examiner

MULTI-PART FRAME FOR A VEHICLE SLIDING SUNROOF OR VEHICLE SLIDING AND TILTING ROOF AND METHOD FOR ASSEMBLING A MULTI-PART FRAME

The invention relates to a multi-part frame for a sliding roof of a vehicle or a tilt-and-slide roof of a vehicle, and a method for installing a multi-part frame.

Sliding roofs or tilt-and-slide roofs of vehicles usually have a frame for guiding and holding a cover element, in particular a movable lid, a roller blind or a shade, which are allocated to a corresponding roof opening and which close or cover the roof opening when they are arranged in a corresponding closed position.

Drive cables, which are mounted on the frame, are provided to move the cover element.

A multi-part cover to cover the drive cables is known from EP 1 291 214 A2. This cover is installed, in particular screwed, in the vertical direction relative to a vehicle plane.

However, a multi-part cover causes much effort during installation, as all the individual parts have to be installed separately, which in turn results in high costs. Moreover, installation in the vertical direction is laborious, as either work has to be carried out overhead or the vehicle subassembly has to be pivoted during the installation.

It is therefore an object of the present invention to provide a frame for a sliding roof of a vehicle or a tilt-and-slide roof of a vehicle which is particularly easy and cost-effective to install.

This object is achieved according to the invention by a multi-part frame for a sliding roof of a vehicle or a tilt-and-slide roof of a vehicle for guiding and holding a movable cover element allocated to a corresponding roof opening, with a support component formed as a plastic injection-moulded part, in which open cable channels are moulded, in order to guide drive cables for moving the cover element, which are in drive engagement with a drive device, displaceably in a compression-resistant manner. The cable channels are configured such that they can be closed by at least one cover likewise formed as a plastic injection-moulded part and fastenable to the support component, wherein the fastening of the cover to the support component is configured such that an installation direction during fastening of the cover to the support component runs in the displacement direction of the cover element. Alternatively, the installation direction runs in the horizontal direction and at the same time transverse to the displacement direction of the cover element, i.e. when the support component is aligned such as if it is provided in an installed position in the vehicle the installation direction runs horizontally. Of course, the support component can also be inclined during an installation. The installation is very easy because the cover can be simply slid onto the support component.

An installation within the meaning of the invention means joining the cover with the support component. The installation direction is thus a direction in which the cover is moved while being joined with the support component.

This means, conversely, an installation within the meaning of the invention does not mean any movement or handling of the cover which would be theoretically possible or takes place during a manufacture of the multi-part frame.

In other words, the fastening of the cover to the support component is configured in particular such that it can be achieved by a horizontal joining movement, namely either in the displacement direction of the cover element or in the horizontal direction and at the same time transverse to the displacement direction of the cover element.

The fastening is preferably achieved by sliding, which also includes plugging, the cover onto the support component.

In particular, the cover can be put onto the support component in the displacement direction of the cover element and locked in place on the support component by a subsequent displacement transverse to the displacement direction of the cover element.

The cover element is, for example, a lid, a roller blind or a shade. For example, the installation direction of the cover on the support component runs in the displacement direction of the cover element.

The cover is preferably formed in one piece, which in turn is advantageous with respect to the installation, as fewer components need to be handled than in the case of a multi-part cover.

According to an embodiment the cable channels are closed towards the bottom or the top by the cover when the frame is installed in a motor vehicle. The terms "bottom" and "top" refer to a state in which the frame is installed in a vehicle. The drive cables can thereby be placed in the cable channels easily during the installation and closed by subsequently sliding the cover onto the support element, if during the installation the support component is mounted in a position in which the cable channels are open towards the top. There is thus no need for the drive cables to be pre-fixed.

Several locking elements, which extend in the displacement direction of the cover element in an installed state of the frame, are preferably located at the cover. Thereby, the advantage is achieved that the cover can directly snap into a mounted position when the cover is slid onto the support component.

In order to fix the cover to the support component, counter elements corresponding to the locking elements can be arranged at the support component, wherein in an installed state of the frame the locking elements are caught in the counter elements, in particular wherein the counter elements are formed as brackets. The cover can thereby be held both in the horizontal direction and in the vertical direction, in particular in such a way that an unintentional release of the cover from the support component is prevented.

According to a further embodiment elongated protrusions, which extend in the displacement direction of the cover element in an installed state of the frame and which cooperate with corresponding holding-down clamps on the support component, can be located at the cover, in order to fix the cover relative to the support component in a vertical direction of the vehicle. In particular, the protrusions and the holding-down clamps cooperate in such a way that the cover is securely jammed to the support component. Thereby, the protrusions act like wedges, which are pushed into the holding-down clamps, wherein the holding-down clamps exert a pressure on the protrusions. In this way, disruptive rattling noises are prevented from occurring between the support component and the cover in the driving mode.

The protrusions have, for example, a lead-in chamfer at their free end directed towards the support component. The lead-in chamfer simplifies the installation of the cover on the support component, in particular the introduction of the protrusions into the holding-down clamps.

The cover is formed trough-shaped for example, wherein one longitudinal web of the trough is preferably provided with the locking elements and the protrusions and the other longitudinal web engages on the support component on the side opposite the open side of the cable channel in the support component. The cover is thereby mounted stably on the support component, firstly by the locking elements and secondly by a longitudinal web of the trough. The force distribution onto the cover is optimized by the trough, especially by the longitudinal web without locking elements. This means that the weight of the cover in the installed state does not need to be borne by the locking elements and protrusions alone, but rather the cover can support itself against the support component, with the result that a strain acting on the locking elements is reduced.

The trough can at the same time act as a stop in the horizontal direction in order to define an installation position of the cover.

In addition, a guide web can be moulded on the support component, wherein the trough partially rests with its inner wall against the guide web, in particular rests flat against it. This likewise contributes to a stable mounting of the cover.

According to an embodiment the cover embraces the support component at least in a subsection. The freedom of movement of the cover relative to the support component is thereby restricted further.

The frame can be fixable on a vehicle body by means of at least one fastening means, in particular a screw, wherein the fastening means additionally fixes the cover on the support component. The cover is thereby secured on the support component, without an additional fastening means being necessary.

Alternatively or additionally, a drive device can be fastened to the support component, wherein the cover is fixed to the support component due to the fastening of the drive device. The cover is thereby particularly reliably prevented from being released from the support component in the driving mode.

According to a preferred embodiment the cover rests against the support component pre-tensioned on the open side of the cable channel in the support component. This likewise contributes to a noise reduction in the driving mode and in the case of an actuation of the drive device.

A guide which serves to guide and hold runout cables, in which the drive cables are at least partially accommodated, is preferably provided at the cover. A course of the runout cables along the cover can be defined thereby. In particular, the runout cables are prevented from slipping out of a desired position in the further course of the installation and being inadvertently pinched during the installation.

The guide is preferably moulded in one piece with the cover.

The guide can comprise at least one clip element. An runout cable can be clipped in the clip element and thus held in a defined position at least in places.

Alternatively or additionally, the guide can comprise guide webs or otherwise formed guide elements.

According to a further embodiment a retaining bracket for accommodating and holding a drive device can be moulded on the cover. This has the advantage that only a few or no additional fastening means are required for installing the drive device.

The object is furthermore achieved according to the invention by a method for installing a multi-part frame for a sliding roof of a vehicle or a tilt-and-slide roof of a vehicle for guiding and holding a movable cover element allocated to a corresponding roof opening, comprising the following steps:
  providing a support component, in which open cable channels are moulded, in particular cable channels that are open towards the bottom or towards the top,
  providing a cover for closing the cable channels, and
  pushing the cover onto the support component, wherein the cover is pushed onto the support component in the displacement direction of the cover element or horizontally and at the same time transverse to the displacement direction of the cover element, and in the process locks in place with the support component.

Such a method allows a frame for a sliding roof of a vehicle or a tilt-and-slide roof of a vehicle to be installed in a particularly easy and cost-effective way.

In other words, the fastening of the cover to the support component, in particular the pushing of the cover onto the support component, is achieved by a horizontal joining movement. The joining movement takes place for example exclusively in the displacement direction of the cover element or at least to a certain extent transverse to the displacement direction.

For example, the joining movement can take place in two steps, wherein the cover is put onto the support component in the displacement direction in a first step and is moved transverse to the displacement direction in a second step, in order to lock the cover in place on the support component.

Further advantages and features of the invention are revealed by the following description and the following drawings, to which reference is made.

Figure 2:
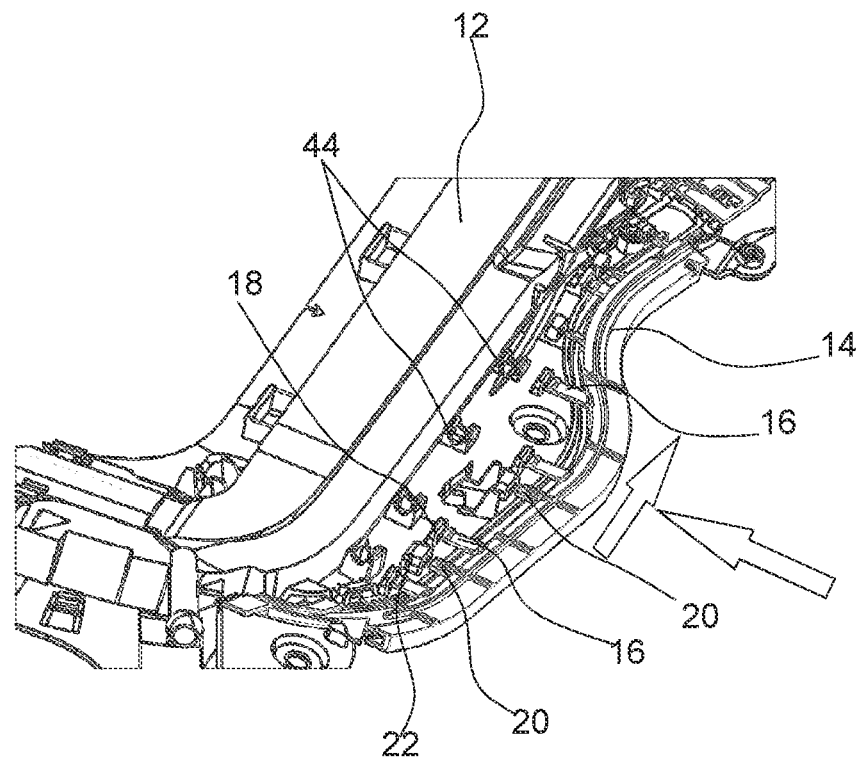
Figure 3:
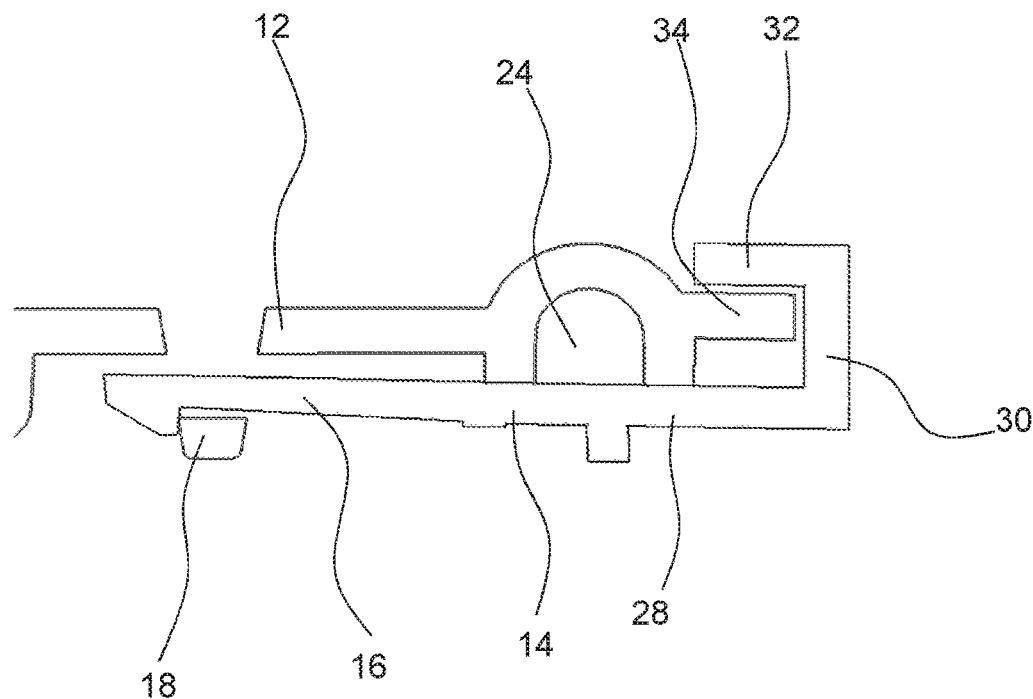
Figure 4:
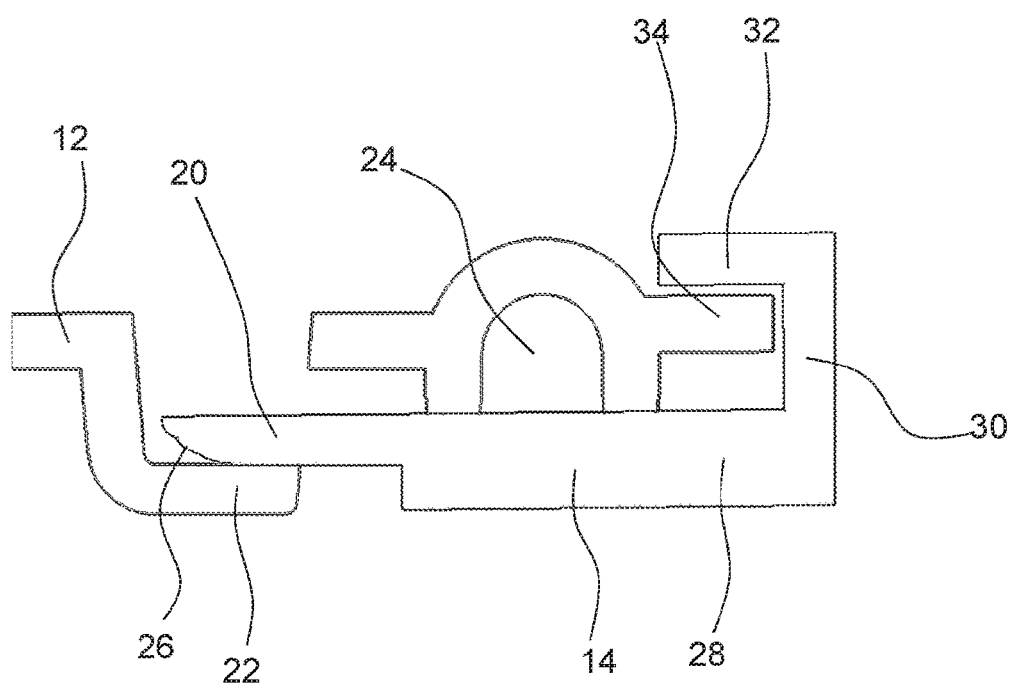
Figure 5:
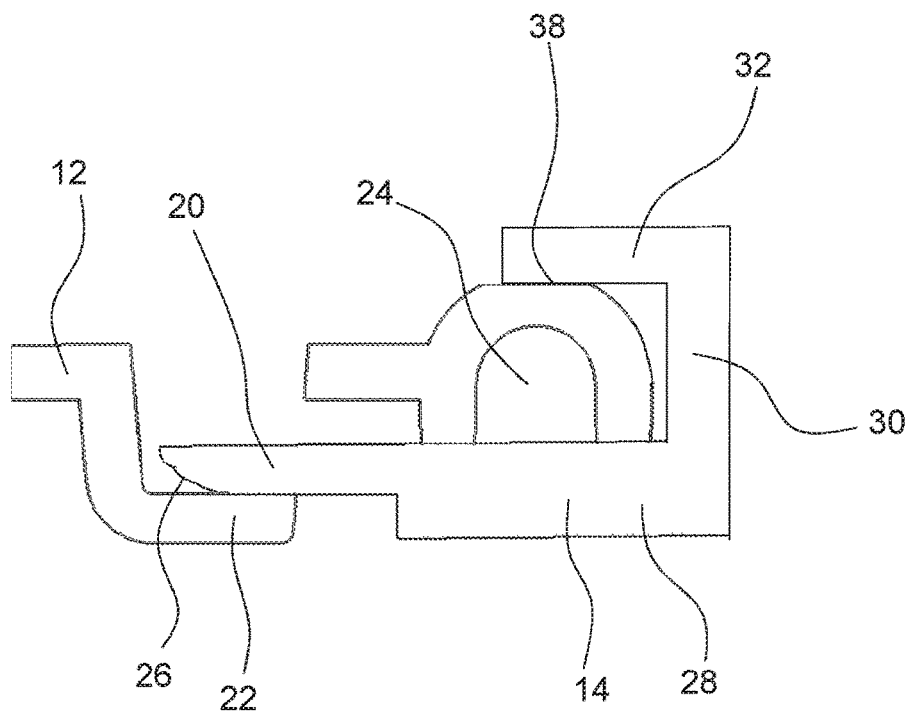
Figure 6:
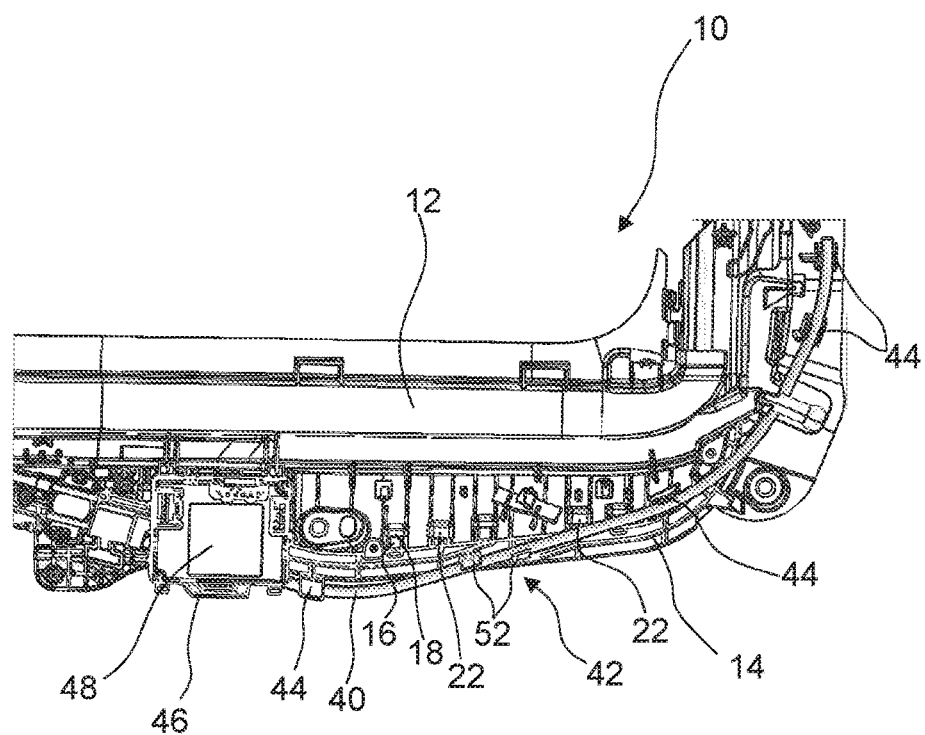

In the drawings:

FIG. 1 shows a part of a frame according to the invention for a sliding roof of a vehicle or a tilt-and-slide roof of a vehicle, FIG. 2 shows an enlarged partial view of the frame from FIG. 1, FIG. 3 shows a partial section through the frame in the area of a locking element, FIG. 4 shows a partial section through the frame in the area of an protrusion, FIG. 5 shows a partial section through a further frame according to the invention in the area of an protrusion and FIG. 6 shows a part of a further frame according to the invention for a sliding roof of a vehicle or a tilt-and-slide roof of a vehicle.

FIG. 1 shows a multi-part frame 10 according to the invention for a sliding roof of a vehicle or a tilt-and-slide roof of a vehicle for guiding and holding a movable cover element allocated to a corresponding roof opening, namely in a view from below.

For the sake of simplicity, only a part of the frame 10 is represented. This comprises a U-shaped support component 12, which is formed as a plastic injection-moulded part, and a cover 14, which is likewise formed as a plastic injection-moulded part and which is fastenable to the support component 12. The cover 14 is shown in a properly installed state in FIG. 1.

FIG. 2 shows the cover 14 in a position during the installation shortly before it is finally fastened to the support component. The installation direction of the cover 14 on the support component runs in the displacement direction of the cover element and horizontally and is indicated by a first arrow. In particular, during the installation the cover 14 is pushed onto the support component 12 in the horizontal direction, in particular in the displacement direction of the cover element, and in the process locks in place with the support component 12. Alternatively, the cover 14 can also be put on laterally, i.e., transverse to the displacement direction and horizontally, as indicated by a second arrow (shown perpendicular to the first arrow and extending from lead line 20 towards lead line 16).

If the cover 14 is moved, starting from the position shown in FIG. 2, further in the installation direction, the cover 14 can snap onto the support component 12. For this purpose, locking elements 16, which run in the displacement direction of the cover element in an installed state of the frame 10, are located at the cover 14.

In a further embodiment the cover 14 can extend to a certain degree in a direction transverse to the displacement direction of the cover element in order to be locked in place on the support component 12.

Counter elements 18 corresponding to the locking elements 16 are arranged at the support component 12, wherein in an installed state of the frame 10 the locking elements 16 are caught in the counter elements 18. In the embodiment represented the counter elements 18 are formed as brackets. These are moulded in one piece with the support component 12.

In addition, elongated protrusions 20, which in an installed state of the frame 10 likewise extend in the displacement direction of the cover element, are located at the cover 14. The protrusions 20 cooperate with corresponding holding-down clamps 22 on the support component, in order to fix the cover 14 relative to the support component 12 in the vertical direction of the vehicle. The holding-down clamps 22 are likewise moulded in one piece with the support component 12.

Furthermore, open cable channels 24 are moulded in the support component 12, in order to guide drive cables for moving the cover element, which are in drive engagement with a drive device, displaceably in a compression-resistant manner. For the sake of simplicity the drive cables are not represented in the figures, but such drive systems are sufficiently known from the state of the art.

Only when the cover 14 is installed on the support component 12, the cable channels 24 are closed, in particular towards the bottom or the top.

This is illustrated in FIGS. 3 and 4, which each show a partial section through the frame 10 in the area of the locking elements 16 and in the area of the protrusions 20.

FIG. 3 shows in particular a condition in which the cover 14 is locked in place at the support component 12.

From the sectional representations of FIGS. 3 and 4 it can be derived that during the fastening of the cover 14 to the support component 12 the locking elements 16 serve mainly to fix the cover 14 on the support component 12 in the horizontal direction and the protrusions 20 serve to fix it in the vertical direction.

It is moreover to be seen in FIG. 4 that the protrusions 20 have a lead-in chamfer 26 at their free end directed towards the support component.

Furthermore, the cover 14, as illustrated in FIG. 4, is mounted, in particular jammed, without play on or against the support component 12 in the vertical direction in the area of the protrusions 20. The cover 14 thereby rests against the support component 12 pre-tensioned on the open side of the cable channel 24. Due to the clamping effect of the protrusions 20 respectively the pre-tensioning, disruptive noises, for example a rattling, are avoided during driving mode.

Furthermore, as can be seen in the sectional representations in FIGS. 3 and 4, the cover 14 is formed trough-shaped, wherein one longitudinal web 28 of the trough 30 is provided with the locking elements 16 and the protrusions 20 and the other longitudinal web 32 engages with the support component 12 on the side opposite the open side of the cable channel 24, in particular the cover 14 embraces the support component 12 at least in a partial area. The cover 14 is thereby mounted stably on the support component 12, because the longitudinal strip 32 forms a mount for the front end of the cover 14.

In order to achieve the mounting, a guide web 34, against which the cover 14 supports itself in particular with the longitudinal web 32, is formed at the support component 12. The guide strip 34 extends in the horizontal direction.

In order to fasten the frame 10 to a vehicle body, a fastening means, for example a screw, can be provided. The fastening means can additionally fix the cover 14 on the support component 12. This additional fastening of the cover 14 to the support component 12 merely serves for additional securing. In the normal driving mode, however, the cover 14 is fastened sufficiently securely to the support component 12 by the locking elements 16.

Alternatively, the cover 14 can at the same time be fastened to the support component due to the fastening of a drive device to the support component 12. For the fastening of the drive device 48 (see FIG. 6) a fastening area 36 (see FIG. 1) is provided at the support component 12.

FIG. 5 shows a partial section through a further frame 10 according to the invention in the area of an protrusion 20.

In this embodiment the longitudinal web 32 supports itself directly against the wall of the cable channel 24, namely against the support component 12 on the side opposite the open side of the cable channel 24 in the support component 12. In order to design the supporting to be particularly stable, the support component 12 has a flat section 38 on the side opposite the open side of the cable channel 24. The guide web 34 can be omitted in this embodiment. The frame 10 can thereby be formed particularly compact, in particular in the horizontal direction, with respect to a state where it is installed in the vehicle.

To accommodate the drive cables, runout cables 40 are provided, which are represented among other things in FIG. 1.

In order to hold the runout cables 40 in a desired position, a guide 42 is provided, which serves to guide and hold the runout cables 40.

The guide 42 comprises several clip elements 44, which are moulded in particular in one piece with the cover 14. If the runout cables 40 are inserted into the clip elements 44, the runout cables 40 are fixedly held at least in places by the clip elements 44, with the result that the runout cables 40 are as far as possible prevented from slipping.

Furthermore, a retaining bracket 46 for holding a drive device 48 is moulded on the cover 14. A drive device 48 is represented in FIG. 6.

In the embodiments shown the retaining bracket 46 has a recess 50 in order to accommodate a locking element provided on the drive device 48. In an alternative embodiment the retaining bracket 46 can have a locking element, which can lock in place at the drive device 48.

FIG. 6 shows a part of a frame 10 according to the invention for a sliding roof of a vehicle or a tilt-and-slide roof of a vehicle according to a further embodiment.

The frame 10 according to FIG. 6 differs from the previously described frame 10 by the shape of the guide 42.

The guide 42 represented in FIG. 6 comprises further guide elements in addition to the clip elements 44.

In particular, the guide 42 comprises two retaining brackets 52, which are arranged spaced apart from each other along the predefined course of the runout cable 40 and offset relative to each other, in such a way that the retaining clamps 52 are arranged on both sides of the runout cable 40. The offset of the retaining clamps 52 relative to each other substantially corresponds to the diameter of the runout cable 40.

In an installed position of the runout cable 40, the retaining clamps 52 embrace the runout cable 40 at least partially. On their side directed towards the runout cable 40 the retaining clamps 52 each have a curved contact surface, which is matched to the contour of the runout cable 40.

The spacing between the retaining brackets 52 along the course of the runout cable 40 is chosen such that the runout cable 40 can be clamped between the retaining brackets 52, as represented in FIG. 6.

The invention claimed is:

1. A multi-part frame for a sliding roof of a vehicle or a tilt-and-slide roof of a vehicle for guiding and holding a movable cover element allocated to a corresponding roof opening,
   with a support component formed as a plastic injection-moulded part, in which open cable channels are moulded, in order to guide drive cables for moving the cover element, which are in drive engagement with a drive device, displaceably in a compression-resistant manner,
   wherein the cable channels are configured such that they can be closed by at least one cover likewise formed as a plastic injection-moulded part and fastenable to the support component, and
   wherein the fastening of the cover to the support component is configured such that an installation direction during fastening of the cover to the support component runs in a displacement direction of the cover element, wherein the displacement direction of the cover element is a horizontal direction, or horizontally and at a same time transverse to the displacement direction of the cover element,
   wherein several locking elements, which run in the displacement direction of the cover element in an installed state of the frame, are located at the cover.

2. The frame according to claim 1, wherein the cover is slid onto the support component during the fastening.

3. The frame according to claim 1, wherein the cable channels are closed towards a bottom by the cover in a state where the frame is installed in a motor vehicle.

4. The frame according to claim 1, wherein counter elements corresponding to the locking elements are arranged at the support component, wherein in the installed state of the frame the locking elements are caught in the counter elements.

5. The frame according to claim 1, wherein elongated protrusions, which extend in the displacement direction of the cover element in the installed state of the frame and which cooperate with corresponding holding-down clamps on the support component, are located at the cover, in order to fix the cover relative to the support component in a vertical direction of the vehicle.

6. The frame according to claim 5, wherein the protrusions have a lead-in chamfer at their free end directed towards the support component.

7. The frame according to claim 5, wherein the several locking elements, which run in the displacement direction of the cover element in the installed state of the frame, are located at the cover, and wherein the cover is formed trough-shaped, and one longitudinal web of the trough is provided with the locking elements and the protrusions and the other longitudinal web engages on the support component on a side opposite an open side of the cable channel in the support component.

8. The frame according to claim 1, wherein the cover embraces the support component at least in a partial area.

9. The frame according to claim 1, wherein the cover rests against the support component pre-tensioned on an open side of the cable channel in the support component.

10. The frame according to claim 1, wherein a guide which serves to guide and hold runout cables, in which the drive cables are at least partially accommodated, is provided.

11. The frame according to claim 10, wherein the guide comprises clip elements and/or retaining clamps.

12. A method for installing a multi-part frame for a sliding roof of a vehicle or a tilt-and-slide roof of a vehicle for guiding and holding a movable cover element allocated to a corresponding roof opening, comprising the following steps:
   providing a support component, in which open cable channels are moulded, the cable channels being open towards a bottom or towards a top,
   providing a cover for closing the cable channels, and
   pushing the cover onto the support component, wherein the cover is pushed onto the support component in a displacement direction of the cover element, wherein the displacement of the cover element is a horizontal direction, or horizontally and at a same time transverse to the displacement direction of the cover element, and in the process locks in place with the support component,
   wherein several locking elements, which run in the displacement direction of the cover element in an installed state of the frame, are located at the cover.

13. The frame according to claim 4, wherein the counter elements are formed as brackets.

14. A multi-part frame for a sliding roof of a vehicle or a tilt-and-slide roof of a vehicle for guiding and holding a movable cover element allocated to a corresponding roof opening,
   with a support component formed as a plastic injection-moulded part, in which open cable channels are moulded, in order to guide drive cables for moving the cover element, which are in drive engagement with a drive device, displaceably in a compression-resistant manner,
   wherein the cable channels are configured such that they can be closed by at least one cover likewise formed as a plastic injection-moulded part and fastenable to the support component, and
   wherein the fastening of the cover to the support component is configured such that an installation direction during fastening of the cover to the support component runs in a displacement direction of the cover element, wherein the displacement direction of the cover element is a horizontal direction, or horizontally and at a same time transverse to the displacement direction of the cover element,
   wherein elongated protrusions, which extend in the displacement direction of the cover element in an installed state of the frame and which cooperate with corresponding holding-down clamps on the support component, are located at the cover, in order to fix the cover relative to the support component in a vertical direction of the vehicle.

* * * * *